United States Patent
Elcock et al.

(10) Patent No.: US 11,394,806 B2
(45) Date of Patent: Jul. 19, 2022

(54) SYSTEM AND METHOD FOR THE TRANSFER OF CONTENT BETWEEN DEVICES

(71) Applicant: ARRIS Enterprises LLC, Suwanee, GA (US)

(72) Inventors: Albert F. Elcock, West Chester, PA (US); Anurag Sharma, Bangalore (IN); Richard Moore, Jr., Harleysville, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/933,578

(22) Filed: Jul. 20, 2020

(65) Prior Publication Data

US 2021/0014335 A1 Jan. 14, 2021

Related U.S. Application Data

(60) Provisional application No. 62/875,573, filed on Jul. 18, 2019.

(51) Int. Cl.
*H04L 67/01* (2022.01)
*H04L 67/1095* (2022.01)
(Continued)

(52) U.S. Cl.
CPC ............ *H04L 67/42* (2013.01); *G06F 16/178* (2019.01); *H04L 67/1095* (2013.01); *H04L 67/1097* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 2010/0071070 A1 | 3/2010 | Jawa et al. | |
| 2011/0088002 A1* | 4/2011 | Freer | H04M 1/72412 715/863 |

(Continued)

FOREIGN PATENT DOCUMENTS

| | | |
|---|---|---|
| CA | 3 002 977 C | 1/2019 |
| JP | 2013-504141 A | 2/2013 |
| WO | 2020/176893 A1 | 9/2020 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Nov. 20, 2020, by the ISA/US, Commissioner for Patent in corresponding International Application No. PCT/US20/42774. (17 pages).

*Primary Examiner* — Jeffrey R Swearingen
(74) *Attorney, Agent, or Firm* — Panitch Schwarze Belisario & Nadel LLP

(57) ABSTRACT

An exemplary method and computing device for receiving a user input and determining whether the user input is a casting action for outputting content from the client device to one or more target devices. The computing device at least one target device of the one or more target devices that is eligible to output the content and identifies content source information associated with the content to be output by the at least one identified target device. One or more content output instructions are generated for outputting the content to the at least one identified target device. The computing device sends the one or more content output instructions to the at least one identified target device over a wireless connection.

20 Claims, 17 Drawing Sheets

(51) Int. Cl.
*G06F 16/178* (2019.01)
*H04L 69/329* (2022.01)
*H04L 67/1097* (2022.01)

(56) References Cited

U.S. PATENT DOCUMENTS

| | | | |
|---|---|---|---|
| 2012/0173622 A1* | 7/2012 | Toledano | H04L 65/4076 |
| | | | 709/204 |
| 2013/0073965 A1* | 3/2013 | Sik | G06F 3/1462 |
| | | | 715/730 |
| 2014/0032635 A1* | 1/2014 | Pimmel | H04M 1/7253 |
| | | | 709/203 |
| 2015/0229997 A1* | 8/2015 | Park | H04N 21/4126 |
| | | | 725/38 |
| 2016/0078582 A1* | 3/2016 | Bhathena | H04L 67/1097 |
| | | | 715/738 |
| 2016/0191989 A1 | 6/2016 | Hardt et al. | |
| 2017/0109519 A1* | 4/2017 | Sugaya | G06F 3/1423 |
| 2017/0230453 A1* | 8/2017 | Verma | H04N 21/23 |
| 2019/0073180 A1* | 3/2019 | Nunan | H04L 67/1095 |
| 2019/0340150 A1* | 11/2019 | Kim | G06F 15/16 |

* cited by examiner

SYSTEM AND METHOD FOR THE TRANSFER OF CONTENT BETWEEN DEVICES

FIELD

The present disclosure relates to controlling the transfer and display of content at multiple screens between different devices.

BACKGROUND

Multimedia content continues to be made available for consumption on a multitude of various devices. Users typically have the capability to access multimedia content at a plurality of devices within a subscriber premise and the content may be provided to a user via various transmission standards and mediums. With the continued growth and mixture of content consuming devices within a premise, it is desirable to improve upon systems and methods for facilitating interactions between the devices.

With various devices and screens from which and screens from which to view content, it is desirable for a user to have the capability to efficiently control the output of content at the various devices. For example, a user viewing content within a first location of a premise on a first device might want to continue viewing the content at a second location of the premise or on a second device. Also, at any given time, multiple users may be viewing different content on different devices within different locations of a subscriber premise. It can be beneficial to provide a user the ability to share or suggest content with another user within the premise. It may also be beneficial to provide a user the ability to share or suggest content with a screen from outside of the premise. Therefore, it is desirable to improve upon methods and systems for facilitating control of displayed content at multiple devices or screens.

SUMMARY

An exemplary for outputting content from a computing device is disclosed, comprising: receiving, via an input device of the computing device, a user input; determining, in a processor of the computing device, whether the user input is a casting action for outputting content from the client device to one or more target devices; identifying, in the processor of the computing device, at least one target device of the one or more target devices that is eligible to output the content; identifying, in the processor of the computing device, content source information associated with the content to be output by the at least one identified target device; generating, in the processor of the computing device, one or more content output instructions for use by the at least one identified target device to output the content; and sending, via an output device of the computing device, the one or more content output instructions to the at least one identified target device over a network over a wireless connection.

An exemplary computing device is disclosed, comprising: an input device configured to receive a user input; a processor configured to: determine whether the user input is a casting action for outputting content to one or more target devices; identify at least one target device of the one or more target devices that is eligible to output the content; identify content source information associated with content to be output by the at least one identified target device; and generate one or more content output instructions for use by the at least one identified target device to output the content; and an output device configured to send the one or more content output instructions to the at least one identified target device over a wireless connection.

An exemplary non-transitory computer readable memory storing program code for outputting content from a computing device, which when the memory is placed in communicable contact with a computing device, the program code causes the computing device to perform the steps of: receiving, via an input device of the computing device, a user input; determining, in a processor of the computing device, whether the user input is a casting action for outputting content from the client device to one or more target devices; identifying, in the processor of the computing device, at least one target device of the one or more target devices that is eligible to output the content; identifying, in the processor of the computing device, content source information associated with the content to be output by the at least one identified target device; generating, in the processor of the computing device, one or more content output instructions for user by the at least one identified target device to output the content; and sending, via an output device the computing device, the one or more content output instructions to the at least one identified target device over a wireless connection.

BRIEF DESCRIPTION OF THE DRAWINGS

Like reference numbers and designations in the various drawings indicate like elements.

DETAILED DESCRIPTION

It is desirable to improve upon methods and system for controlling display of content at multiple devices. The methods, system, and computer readable media described in this disclosure enable the transfer and/or sharing of content between multiple devices. An interface may be used by a subscriber to cause content being viewed on a first device to be displayed at one or more other devices. Using an interface at a control device or source device, a user can selected one or more target devices, and various options for outputting content from the content source at the target device(s). Selected content may be shared with or transferred to one or more target devices.

A user may access an application at a control device, wherein the application allows the user to select, share, and/or transfer content to one or more target devices. The selection of content and a target device may be made using an interface at the control device, wherein the interface includes tiles representing one or more target devices. A user may use the various input techniques to modify the output of content at one or more target devices.

Figure 1:
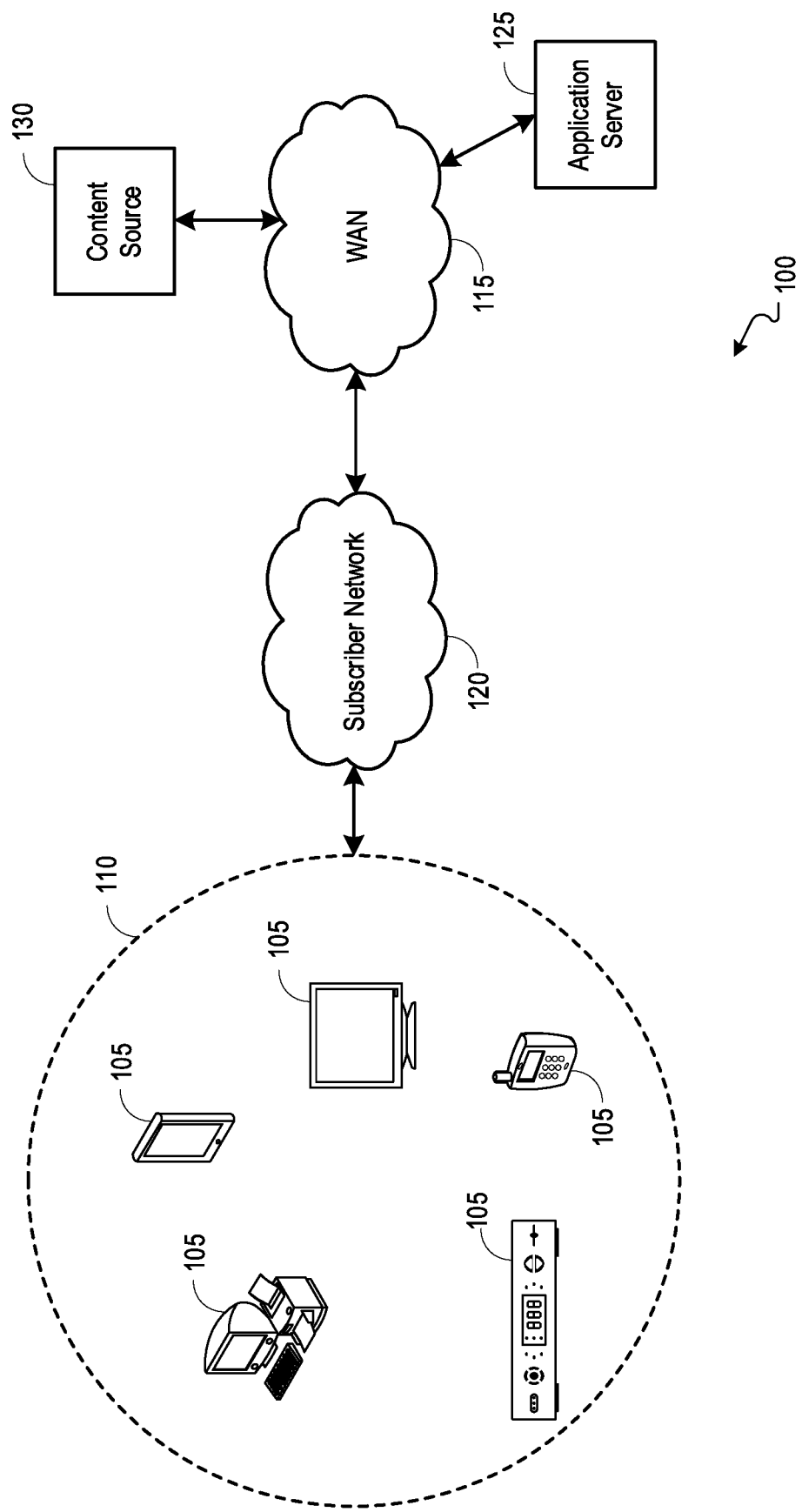
FIG. 1 is a block diagram illustrating a network environment operable to facilitate the control of displayed content at multiple devices in accordance with an exemplary embodiment of the present disclosure.

FIG. 1 is a block diagram illustrating a network environment 100 operable to facilitate the control of displayed content at multiple devices in accordance with an exemplary embodiment of the present disclosure. In exemplary embodiments, video, voice, and/or data services may be delivered to one or more client devices 105. Client devices 105 may include a television, mobile device, tablet, computer, set-top box (STB), gaming device, and any other device operable to receive video, voice, and/or data services. It should be understood that various multimedia services may be delivered to the client devices 105, including but not limited to, live television, video-on-demand (VoD) content, pay-per view content, audio-only content, and Internet or application content such as YouTube or Netflix content. It should be further understood that a television may be connected to and controlled by a STB.

Multiple services may be delivered to client devices 105 over a local network 110. The local network 110 may include a local area network (LAN), wireless local area network (WLAN), personal area network (PAN), mobile hotspot network, and others. The local network 110 may be provided at a subscriber premise by a gateway device, modem device, or other access device. It will be appreciated by those skilled in the relevant art that delivery of the multiple services over the local network 110 may be accomplished using a variety of standards and formats.

In exemplary embodiments of the present disclosure, multiple services (e.g., video, voice, and/or data services) may be delivered from a wide-area network (WAN) 115 to the local network 110 through a connection to a subscriber network 120. The subscriber network may include an optical network, hybrid fiber coaxial (HFC) network, twisted-pair, mobile network, high-speed data network, and others. Multiple systems operator (MSO) devices and/or network within the WAN 120 may be used to provide, manage, and/or troubleshoot the multiple services provided to subscribers.

It will be appreciated by those skilled in the relevant art that client devices 105 may be capable of interacting and communicating with each other over various wireless communication standards (e.g., Wi-Fi, Bluetooth, etc.). The client devices 105 connected to a home network 110 may receive services according to one or more subscriptions between a subscriber and service provider.

According to exemplary embodiments, a control device can be configured to provide a subscriber with an interface for managing content received and displayed by one or more other target devices (e.g., client devices 105, smart televisions, STBs, smart media devices, and/or other device that may communicate over the home network 110). For example, a subscriber can access an application through a control device, wherein the subscriber can view other client devices 105, which can be managed through the application, can identify programming information associated with content being displayed on the other client devices 105, and can choose one or more of the other client devices 105 through which to display subscriber-selected content. The control device may be a mobile device, tablet, or any other device that is configured to provide a user interface.

A subscriber can initiate at a client device 105 (i.e., a control device and/or target device), an application configured to manage content received and displayed at one or more other client devices 105. According to an exemplary embodiment, when a subscriber initiates the application, a message can be sent from the initiating client device 105 to a content transfer server. The content transfer server may store information associated with client devices 105 under the control of a subscriber, content provided to the client devices, and subscription information associated with the client devices 105. It should be understood that the content transfer server may be located at a network back office (e.g., connected to the WAN 115), or may be located within a subscriber premise (e.g., connected to the local network 110).

In exemplary embodiments of the present disclosure, the content transfer server can maintain a list of client devices 105 that are connected to a local network 110 and/or are otherwise associated with a client device initiating a content transfer application. For example, the content transfer server can periodically request connection updates from client devices 105 or can receive notification when a client device 105 makes a new association with another client device or when a new client device 105 joins the local network 110.

The content transfer server can maintain current status information associated with each client device 105 (e.g., power state, tuning state, content displayed). For example, the content transfer server may periodically request state information and/or tuning/content information from each of the client devices 105 or the content transfer server may receive status updates from a client device when the client device experiences a power state change (e.g., powers up or down) or when the client device tunes to a different channel or content source. It will be appreciated by those skilled in the relevant art that the content transfer server can use various communication techniques and methods to maintain a current list of client devices and corresponding status information.

The content transfer server can maintain subscription information associated with one or more client devices 105 or a subscriber associated with the client devices 105. For example, the content transfer server may have access to subscription information (e.g., internally or through a connection to an external server), and can determine what services and/or programming is available to a client device 105 or subscriber by looking up the corresponding subscription information.

The content transfer server can respond to the initiating client device 105 by sending the client device 105 information associated with the client devices 105 under the control of the subscriber, content provided to the client devices, and subscription information associated with the client devices 105. An interface displayed at the client device 105 can show each of the one or more client devices 105 that are capable of being controlled by the application. The interface may also show information associated with the content (e.g., program information such as title, channel, summary, etc.) currently being displayed at each of the client devices 105. Each of the client devices 105 may be listed within the interface as a window or tile, and each window or tile may be displayed as a screenshot or thumbnail of content currently being viewed on the associated client device 105.

In exemplary embodiments, subscriber information may be used at the initiating client device 105 to generate a list of content that is available to the subscriber. For example, a list of available content including, but not limited to television channels, pay per view content, VoD or recorded content, Internet multimedia content, pictures, music, HTML5 objects, file system objects, and others may be displayed within an interface at the initiating client device 105.

According to exemplary embodiments, a subscriber using the initiating client device 105 can select content and can select one or more client devices 105 through which the selected content is to be displayed. Selected content may include content being currently viewed at one of the client devices 105 or may include content that is selected from a list of content available to the subscriber, and the selected client device(s) 105 may be any of the client devices 105 that are configured to receive the selected content. When the subscriber selects the content and target client device(s) 105 (e.g., the client device 105 selected for displaying the content), the initiating, or control, client device 105 can generate and output a message to the target device(s), wherein the message includes information identifying the selected content, a source for the content, and/or a specific point (i.e., time marker) at which to begin playback of the content at the target device.

The control device can generate and transmit a message to the target client device(s) 105, wherein the message includes content information to allow the target client device(s) 105 to tune to the selected content. The content information can include a channel or source identifier (e.g., channel number, uniform resource locator (URL), etc.), and can further include identification of a specific segment of the content from which to begin playback of the content. For example, the subscriber may request that the target client device 105 begins playback of the content from the point at which the content was paused or most recently displayed at a different client device 105. When the target client device 105 receives the message from the content transfer server, the target client device 105 can tune to the content identified within the message. It will be appreciated by those skilled in the relevant art that the identified content may be transcoded according to one or more formats associated with the target device before or during reception of the content by the target device.

According to exemplary embodiments, the control device can output a message to the one or more target client devices 105, the message causing the target client device to prompt a user whether to decline or accept the shared or transferred content. For example, the target client device 105 can display an interface to a user, wherein the interface provides the user with information associated with the shared or transferred content (e.g., program information, information identifying the source or transferring user, etc.). The user can then select an option to decline or accept the offer to display the content on the target client device 105.

In embodiments, the application interface can provide a subscriber with the option to transfer or share content being viewed on a source client device 105 to a target client device 105. If the subscriber chooses to transfer content from the source client device 105 to the target client device 105, the control device can send a message to the source client device 105 causing the source client device 105 to cease display of the content and/or to power down, and can send a message to the target client device 105 causing the target client device 105 to tune to the content and/or to be powered on.

"Picture in Picture" where swiped content is displayed within existing content currently being viewed (standard examples are, "picture in picture", "picture in guide", video and graphics scaling . . . ).

The mobile application selects content in the format supported by the target SMD for the use cases where content is being swiped from a cloud location. For example, if a user elects to Swipe 4K content from a cloud location to a SMD that only supports HD, the application attempts to find the same content in HD format and initiates delivery of HD content to the target SMD.

When the "Proximity" mode of operation is selected, content is delivered to the SMD that is closest to the mobile device (SMD #1). As the mobile device moves away from SMD #1 and comes within proximity of another (SMD #2), the content is removed from SMD #1 and is then delivered to SMD #2 to be displayed.

In the case of video content, the video will resume playing on the mobile device if no SMD is within proximity.

In exemplary embodiments of the present disclosure, a control device and/or one or more other client devices 105 may be configured with an identification of available content sources, available media devices (e.g., target devices), and/or one or more account or subscription credentials (e.g., user name, password, etc.).

According to exemplary embodiments described herein, a control device may include a user interface through which a user may input a command. For example, the control device may include a touchscreen through which a user input may be a haptic (e.g., a swipe pattern) based interaction. As another example, the control device may include a voice interface though which a user input may be a voice command. Table 1 shows example swipe actions or patterns and associated display instructions and corresponding actions. The swipe actions may be received at a control device (e.g., mobile device, tablet, etc.), and the control device may output corresponding display instructions to one or more target devices (e.g., smart media devices (SMDs) such as set-top boxes (STBs), smart televisions, and/or other media devices capable of wireless communication).

TABLE 1

| Swipe Action | From | To | Description |
| --- | --- | --- | --- |
| Up | Mobile Device | SMD | Content stops playing on Mobile Device, and begins playing on SMD from same position in the content. If TV connected to the SMD was powered off, SMD powers on the TV. |
| Down | Current SMD(s) | Mobile Device | Content stops playing on SMD, and begins playing on Mobile Device from the same position in the content. User has the option for the SMD to automatically power off the TV. |
| 'V' | Mobile Device | SMDy | User swipes a 'V' pattern and is presented with list of SMDs. User selects destination SMD (one or more). Content pauses on mobile device and begins playing on selected SMD(s) from same position in the content. If TV connected to the SMD was powered off, SMD powers on the TV. |
| Two Fingers Up | Mobile Device | All SMDs | Content stops playing on Mobile Device, and begins playing on All SMDs from same position in the content. If any of the TVs connected to the SMDs were powered off, the SMD powers on the TV. |
| Left | Mobile Device | SMD(s) | When one or more SMDs is displaying content, swipe left transitions to previous content item in the list. |
| Right | Mobile Device | SMD(s) | When one or more SMDs is displaying content, swipe right transitions to next content item in the list. When SMD(s) is displaying a photo, add music and begin a Slide Show. |
| 'M' | Mobile Device | SMD(s) | Repeated 'M' swipes progresses music selection to next one in a configurable list of music tracks |

In exemplary embodiments, through the user interface of a control device, a user may initiate a transfer of content to all target devices connected to a LAN or select one or more specific target devices to which content is transferred. According to exemplary embodiments, the control device may be configured to communicate with one or more target devices in order to determine a distance between the control device and each of the one or more target devices. For example, the control device may be configured to simultaneously communicate over a plurality of channels (e.g., Bluetooth and/or Wi-Fi channels), and a first channel may be utilized by the control device to transmit and receive proximity information (e.g., probes and/or probe responses). The control device may utilize a second channel to pass display instructions to one or more target devices. For example, when the control device determines that the control device is near in proximity to a certain target device, the control device may output display instructions to the certain target device, wherein the display instructions cause the certain target device to output or display content that is identified within the display instructions.

In exemplary embodiments, a user may access the content and display switching features through an application that is downloaded to a control device. For example, an application may be downloaded at a control device (e.g., mobile device, tablet, etc.) from an application server 125. The application, or information associated with the application, may be downloaded at one or more other client devices 105, or the control device may push the application to the one or more other client devices 105.

In response to a user input or a detection of a change in proximity between a control device and one or more target devices, the control device may output display instructions to one or more target devices. For example, the display instructions may include a source identifier (e.g., IP address, URL (uniform resource locator), etc.) to be used by a target device in order to retrieve corresponding content from a content source 130 and/or information identifying a certain point within the content from which to begin retrieving the corresponding content. Multiple streams may be output through a STB or television. For example, an independent audio stream may be played back (mixed) with video content to which the audio is not associated.

The interface may be displayed at a control device (e.g., client device 105 of FIG. 1) upon an initiation of an application for controlling displayed content at a target device. It will be appreciated by those skilled in the relevant art that the interface may be displayed to a subscriber using various interface types (e.g., graphical user interface (GUI), touch-screen interface, etc.).

The interface may include a list of one or more target devices. The target devices may be represented as one or more target device tiles. Each of the target device tiles may be associated with a device (e.g., client device 105 of FIG. 1) that may be connected to a local network (e.g., local network 110 of FIG. 1) or that may otherwise be controlled by a subscriber. The target device tiles may be generated based upon information received from a user or other information gathered by the control device or other client device 105.

The one or more content sources may include sources available to a subscriber or client device, for example, content sources made available through a subscription. Content sources may include live television channels, recorded content, VoD content, pay-per view content, Internet or application multimedia content (e.g., YouTube, Netflix, etc.), sources of pictures (e.g., photos stored in a cloud server, locally stored photos, etc.), sources of music (e.g., streaming music applications, locally stored music, etc.), and others.

In exemplary embodiments, the control device may transfer content from the control device to one or more target devices. For example, the control device may transfer the content (e.g., video, photos, music, etc.) to the one or more target devices. In embodiments, the control device may stream content to one or more target devices, and the control device may include a user interface through which a user may control trickplay (e.g., pause, fast-forward, rewind, etc.) and/or playback of the streamed content at the one or more target devices.

According to exemplary embodiments, when an output of content begins at a target device or control device in response to user input, content being output by the target device or control device at the time the user input was received may be paused. When the new content ends at the target device or control device, output of the content that was paused at the target device or control device may resume.

Figure 2:
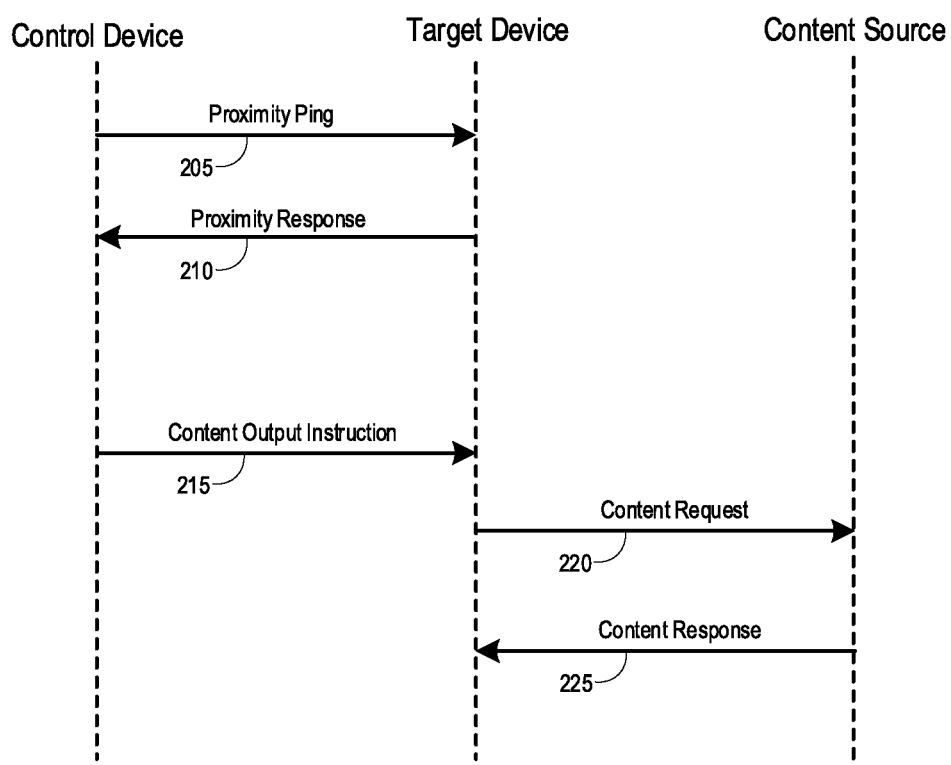
FIG. 2 is a transition diagram showing communications operable to facilitate the control of displayed content at multiple devices in accordance with an exemplary embodiment of the present disclosure.

FIG. 2 is a transition diagram 200 showing communications operable to facilitate the control of displayed content at multiple devices in accordance with an exemplary embodiment of the present disclosure. The control device may output a proximity ping 205, wherein the proximity ping 205 may be received by one or more target devices that are within range of the control device or that are otherwise connected to a LAN associated with the control device. The control device may receive a proximity response 210 from one or more target devices, wherein the proximity response 210 is output from each target device in response to a proximity ping 205 being received by each target device, and wherein the proximity response 210 includes information from which the control device may determine a proximity between the control device and each target device. The control device may utilize a first channel (e.g., Bluetooth channel, WiFi channel, etc.) to transmit the proximity pings 205 and receive the proximity responses 210.

In response to a user input or an indication by a proximity response 210 that the distance between the control device and a target device is within a certain range, the control device may output a content output instruction 215 to one or more target devices. For example, the content output instruction 215 may include a source identifier (e.g., IP address, URL (uniform resource locator), etc.) to be used by a target device in order to retrieve corresponding content from a content source and/or information identifying a certain point within the content from which to begin retrieving the corresponding content. For example, the content output instruction 215 can include information that may be used by the target device to tune to the identified content.

According to exemplary embodiments of the present disclosure, the content output instruction 215 may include the content data itself. For example, the content output instruction 215 may include a transmission of the content that is to be output at the target device. In exemplary embodiments, the content output instruction 215 may include a streaming session wherein the content is streamed from the control device to the target device. The content output instruction 215 may include one or more trickplay or playback commands that are output from the control device in response to user input received through a user interface of the control device.

In exemplary embodiments described herein, the content output instruction 215 may include a command to power up the target device (e.g., using an HDMI/CEC command). The content output instruction 215 may include an instruction to output a prompt to the target device, the prompt asking a user to choose whether to continue viewing content being displayed at the target device or to view the content being transferred to or shared with the target device.

In exemplary embodiments of the present disclosure, a user may be presented with various options for controlling the output of content at target devices and/or control devices. For example, a user can be prompted at an interface to select whether to share selected content with or transfer selected content to a target device. If the user selects the option to share selected content, the control device (e.g., the selected client device that is currently displaying the desired content) can continue to display the content currently being displayed. If the user selects the option to transfer the selected content, the control device can be instructed to cease display of the content. In embodiments, a content output instruction 215 may include a command to power down a connected television (e.g., using an HDMI/CEC command). It should be understood that a target device may be powered down or a tuner associated with the target device may be tuned away from the current channel in order to cause the device to cease output of certain content.

Using information provided by a content output instruction, a target device may output a content request 220 to a content source, and the content may be delivered to the target device through a content response 225 received at the target device from the content source.

The interface may be displayed at a control device (e.g., client device 105 of FIG. 1) upon an initiation of an application for controlling displayed content at a target device. It will be appreciated by those skilled in the relevant art that the interface may be displayed to a subscriber using various interface types (e.g., graphical user interface (GUI), touch-screen interface, etc.).

The interface may include a list of one or more target devices. The target devices may be represented as one or more target device tiles. Each of the target device tiles may be associated with a device (e.g., client device 105 of FIG. 1) that may be connected to a local network (e.g., local network 110 of FIG. 1) or that may otherwise be controlled by a subscriber. The target device tiles may be generated based upon information received from a user or other information gathered by the control device or other client device 105.

The one or more content sources may include sources available to a subscriber or client device, for example, content sources made available through a subscription.

Content sources may include live television channels, recorded content, VoD content, pay-per view content, Internet or application multimedia content (e.g., YouTube, Netflix, etc.), sources of pictures, sources of music, and others.

Figure 3:
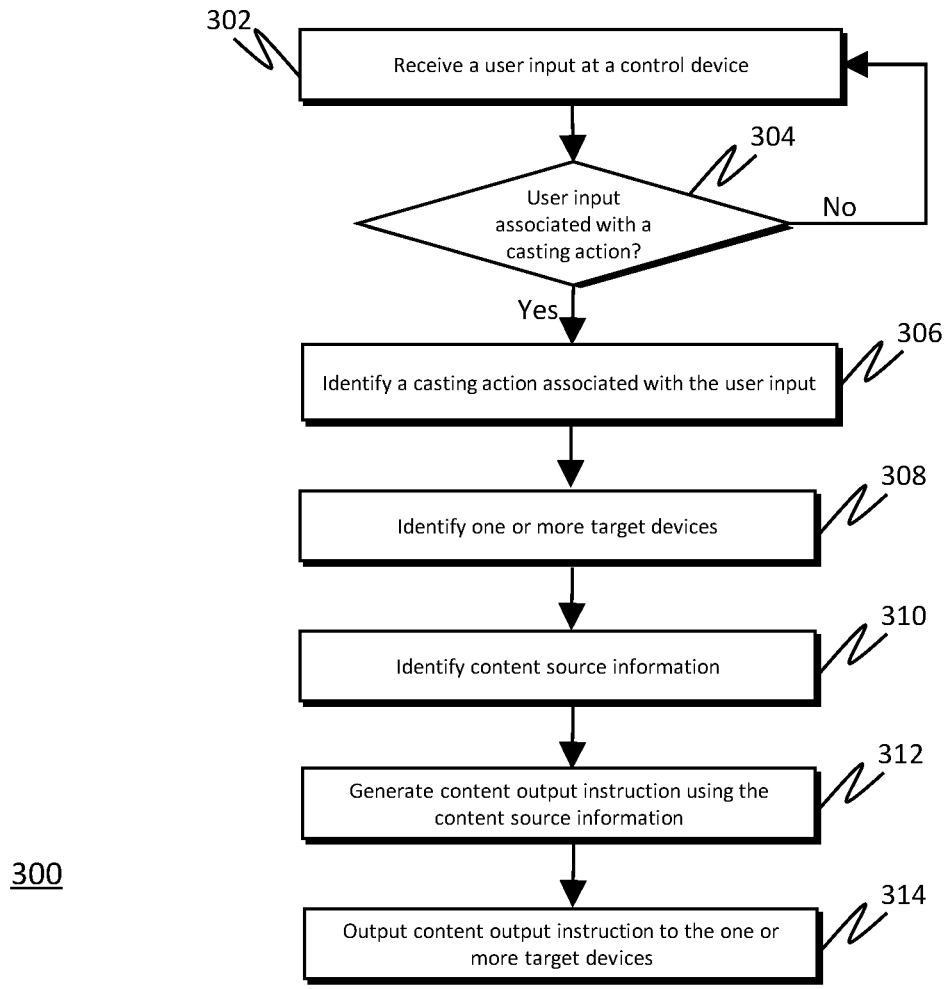
FIG. 3 is a flowchart illustrating a process operable to facilitate an output of a content instruction in response to a received user input in accordance with an exemplary embodiment of the present disclosure.

FIG. 3 is a flowchart illustrating a process 300 operable to facilitate an output of a content instruction in response to a received user input in accordance with an exemplary embodiment of the present disclosure. In response to receiving a user input (e.g., swipe action, voice command, etc.) at a control device (step 302), the determination may be made whether the user input is associated with a casting action (step 304). Casting actions may include various actions for changing content displayed at one or more target devices and/or the control device, and actions for changing the target devices that are displaying a piece of content. The casting action associated with the user input may be identified, for example, from a mapping of the user input to the associated casting action (step 306).

One of more target devices that are to output a piece of content may be identified (step 308). The one or more target devices may be identified based upon the casting action associated with the user input or based upon a determination of a proximity between the control device and one or more client devices 105.

Content source information may be identified by the control device (step 310). For example, the control device may identify content source information based upon content that is currently being output by the control device or by one or more other client devices 105.

Using the content source information, the control device may generate one or more content output instructions (step 312), and the one or more content output instructions may be output from the control device to the one or more identified target devices (step 314).

Figure 4:
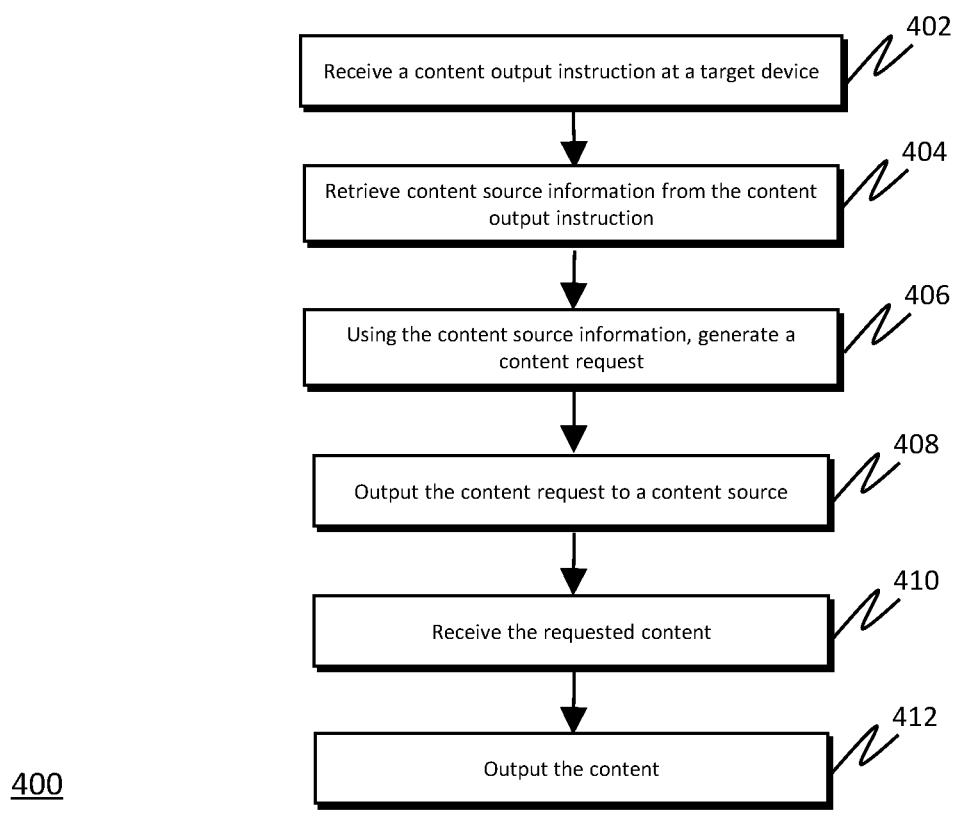
FIG. 4 is a flowchart illustrating a process operable to facilitate a retrieval of content in response to receiving a content output instruction in accordance with an exemplary embodiment.

FIG. 4 is a flowchart illustrating a process 400 operable to facilitate a retrieval of content in response to receiving a content output instruction in accordance with an exemplary embodiment. A target device may receive a content output instruction (step 402), for example, from a control device, and the target device may retrieve content source information from the content output instruction (step 404). For example, the content source information may identify a piece of content to be output by the target device, a content source from which the content may be requested, and/or a point within the piece of content from which the target device is to begin outputting the piece of content.

Using the content source information, the target device may generate a content request (step 406) and output the content request to a content source associated with the piece of content that is identified from the content output instruction (step 408).

The target device may receive the requested content from the content source (step 410), and the target device may begin outputting the content (step 414).

Figure 5:
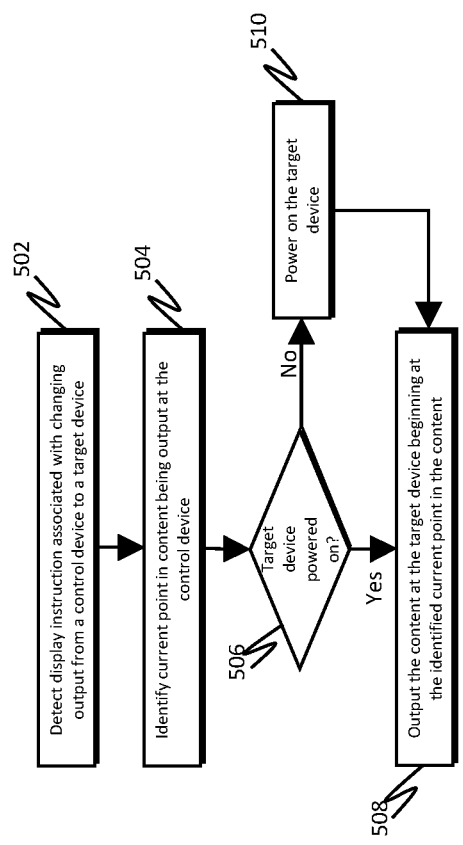
FIG. 5 is a flowchart illustrating a process operable to facilitate changing an output device from a control device to a target device in accordance with an exemplary embodiment.

FIG. 5 is a flowchart illustrating a process 500 operable to facilitate changing an output device from a control device to a target device in accordance with an exemplary embodiment. In response to detecting a display instruction (e.g., user input) associated with changing content output from a control device to a target device (step 502), the control device may identify a current point in a piece of content being output at the control device (step 504).

The determination may be made whether the target device is powered on (step 506). If the target device is powered on, the piece of content may be retrieved and output by the target device beginning at the identified current point in the content (step 508). If the target device is not powered on, the target device may be powered on (step 510) before outputting the content at the target device (step 508).

Figure 6:
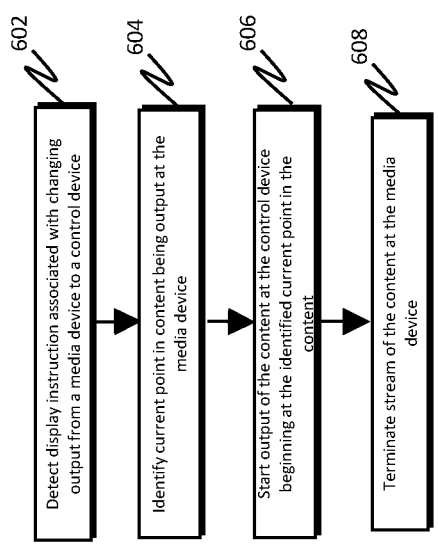
FIG. 6 is a flowchart illustrating a process operable to facilitate changing an output device from a media device to a control device in accordance with an exemplary embodiment.

FIG. 6 is a flowchart illustrating a process 600 operable to facilitate changing an output device from a media device to a control device in accordance with an exemplary embodiment. In response to detecting a display instruction (e.g., user input) associated with changing content output from a media device to a control device (step 602), the control device may identify a current point in a piece of content being output at the media device (step 604).

The control device may retrieve and start output of the content at the control device beginning at the identified current point in the content (step 606), and the stream of the content at the media device may be terminated (step 608).

Figure 7:
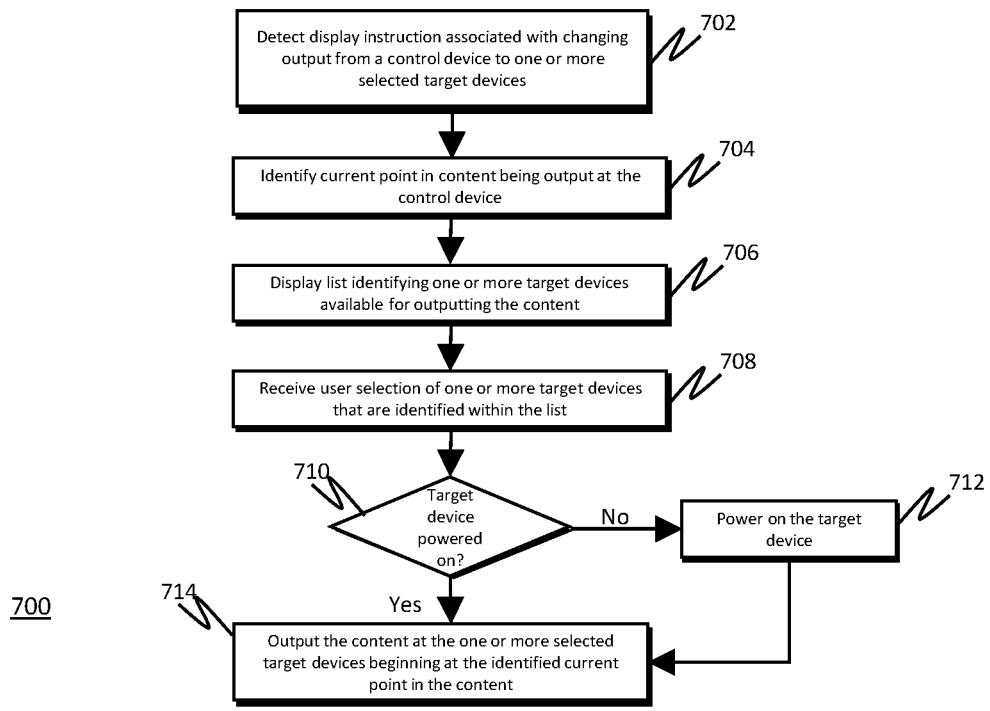
FIG. 7 is a flowchart illustrating a process operable to facilitate a user selection of one or more target devices for outputting content in accordance with an exemplary embodiment.

FIG. 7 is a flowchart illustrating a process 700 operable to facilitate a user selection of one or more target devices for outputting content in accordance with an exemplary embodiment. In response to detecting a display instruction (e.g., user input) associated with changing content output from a control device to one or more selected target devices (step 702), the control device may identify a current point in a piece of content being output at the control device (step 704).

The control device may output a list identifying one or more target devices available for outputting the content (e.g., one or more target devices connected to a LAN associated with the control device) (step 706).

The control device may receive user input of a user selection of one or more target devices that are identified within the list (step 708).

The control device may determine whether the target device is powered on (step 710). If the target device is powered on, the one or more selected target devices may receive and initiate output of the content beginning at the identified current point in the content (step 712). If the target device is not powered on, the target device may be powered on (step 714) before the content is output at the one or more selected target devices (step 712).

Figure 8:
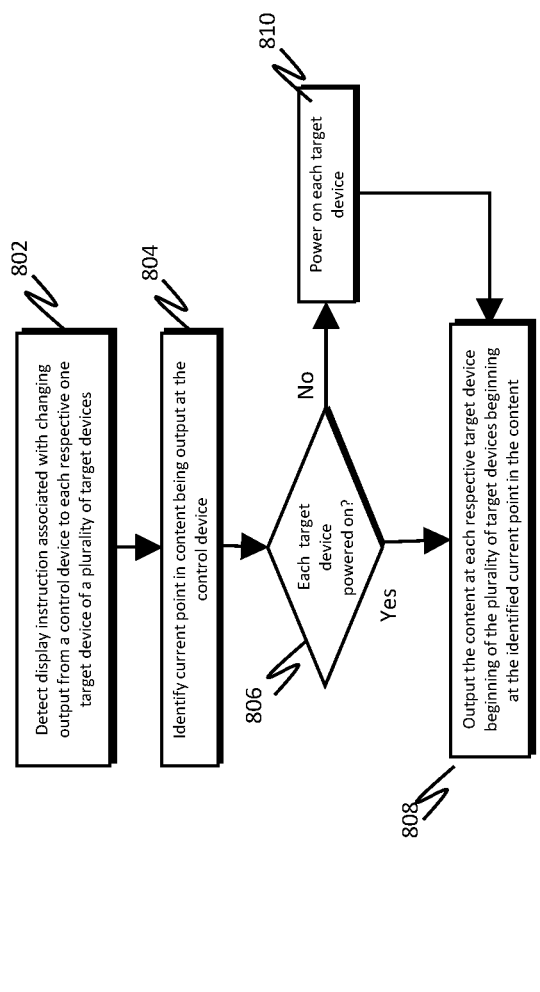
FIG. 8 is a flowchart illustrating a process operable to facilitate changing an output device from a control device to all available target devices in accordance with an exemplary embodiment.

FIG. 8 is a flowchart illustrating a process 800 operable to facilitate changing an output device from a control device to all available target devices in accordance with an exemplary embodiment. In response to detecting a display instruction (e.g., user input) associated with changing content output from a control device to each respective one target device of a plurality of target devices (step 802), the control device may identify a current point in a piece of content being output at the control device (step 804).

The control device may determine whether each respective target device is powered on (step 806). If each respective target device is powered on, the content may be received and output of the content is initiated beginning at the identified current point in the content (step 808). If each respective target device is not powered on, one or more of the respective target devices may be powered on (step 810) before outputting the content at the target device (step 808).

Figure 9:
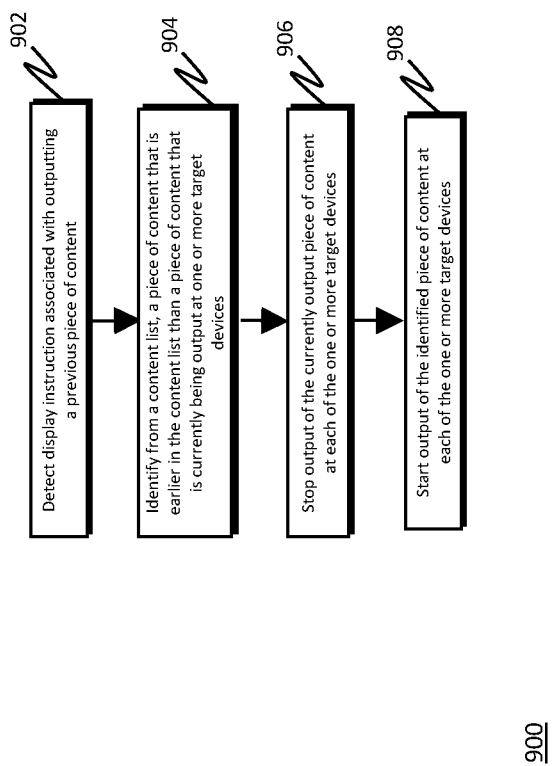
FIG. 9 is a flowchart illustrating a process operable to facilitate switching output content from a current piece of content to a previous piece of content in accordance with an exemplary embodiment.

FIG. 9 is a flowchart illustrating a process 900 operable to facilitate switching output content from a current piece of content to a previous piece of content in accordance with an exemplary embodiment. In response to detecting a display instruction (e.g., user input) associated with outputting a previous piece of content (step 902), the control device, or one or more target devices, may identify from a content list, a piece of content that is earlier in the content list than a piece of content that is currently being output at the one or more target devices (step 904).

Output of the currently output piece of content may be stopped at each of the one or more target devices (step 906), and an output of the identified piece of content may be started at each of the one or more target devices (step 908).

Figure 10:
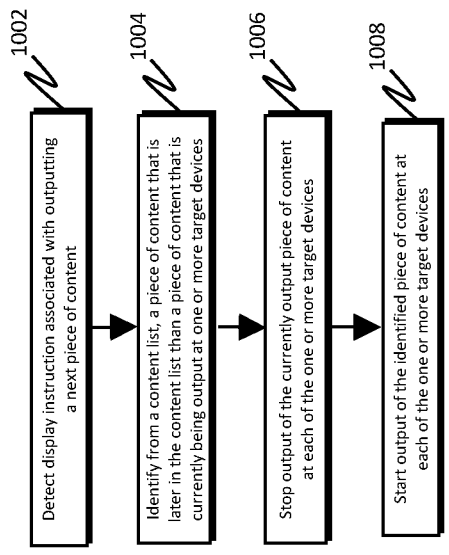
FIG. 10 is a flowchart illustrating a process operable to facilitate a switching output content from a current piece of content to a next piece of content in accordance with an exemplary embodiment.

FIG. 10 is a flowchart illustrating a process 1000 operable to facilitate a switching output content from a current piece of content to a next piece of content in accordance with an exemplary embodiment. In response to detecting a display instruction (e.g., user input) associated with outputting a next piece of content (step 1002), the control device, or one or more target devices, may identify from a content list, a piece of content that is later in the content list than a piece of content that is currently being output at the one or more target devices (step 1004).

Output of the currently output piece of content may be stopped at each of the one or more target devices (step 1006), and an output of the identified piece of content may be started at each of the one or more target devices (step 1008).

Figure 11:
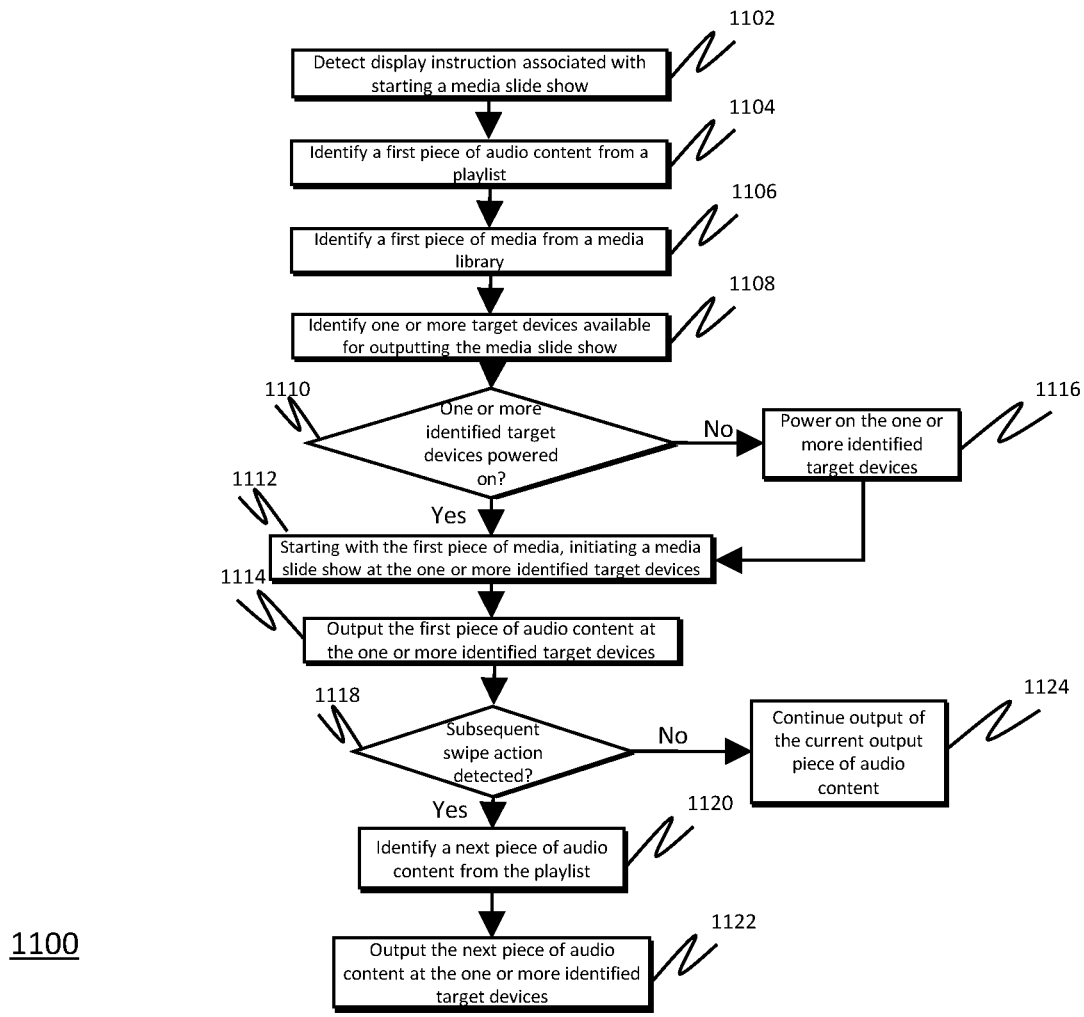
FIG. 11 is a flowchart illustrating a process operable to facilitate starting a media slide show at one or more target devices in accordance with an exemplary embodiment.

FIG. 11 is a flowchart illustrating a process 1100 operable to facilitate starting a media slide show at one or more target devices in accordance with an exemplary embodiment. In response to detecting a display instruction (e.g., user input) associated with starting a media slide show (step 1102), the control device, or one or more target devices, may identify a first piece of audio content from a playlist (step 1104) and a first piece of media from a media library (e.g., a piece of media currently being displayed at the control device or one or more target devices) (step 1106).

The control device may identify one or more target devices available for outputting the media slide show (step 1108).

The control device may determine whether the one or more identified target devices is powered on (step 1110). If the one or more identified target devices is powered on, starting with the first piece of media, the control device may initiate a media slide show at each of the one or more identified target devices (step 1112) and output the first piece of audio content at each of the one or more identified target devices (step 1114). If the one or more identified target devices is not powered on, the one or more identified target devices may be powered on (step 1116) before outputting the first piece of media and the first piece of audio content at the one or more identified target devices (steps 1112, 1114).

If, while the media slide show is ongoing, a subsequent swipe action associated with starting a media slide show is detected (step 1118), a next piece of audio content may be identified from the playlist (step 1120), and the next piece of audio content may be output at the one or more identified target devices in place of the current piece of audio being output (step 1122). If, while the media slide show is ongoing, no subsequent swipe action is detected, output of the currently output piece of audio content is continued (step 1124).

Figure 12:
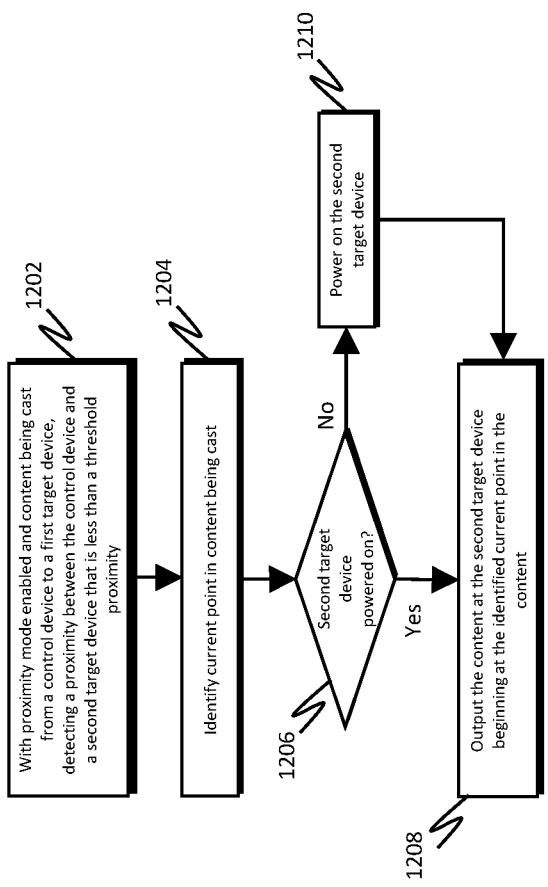
FIG. 12 is a flowchart illustrating a process operable to facilitate switching output devices based upon a detected change in proximity between a control device and one or more target devices in accordance with an exemplary embodiment.

FIG. 12 is a flowchart illustrating a process 1200 operable to facilitate switching output devices based upon a detected change in proximity between a control device and one or more target devices in accordance with an exemplary embodiment. With a proximity mode enabled and content being cast from a control device to a first target device, the control device may detect a proximity between the control device and a second target device that is less than a threshold proximity (step 1202). For example, a first channel may be utilized by the control device to determine a proximity between the control device and one or more client devices 105. The proximity information retrieved by the control device over the first channel may indicate a client device 105 that is nearest to the control device.

The control device may identify a current point in the content that is being cast to the first target device (step 1204).

The determination may be made whether the second target device is powered on. If the second target device is powered on (step 1206), the piece of content may be retrieved and output by the second target device beginning at the identified current point in the content (step 1208). If the second target device is not powered on (step 1206), the second target device may be powered on before outputting the content at the second target device (step 1210).

Figure 13:
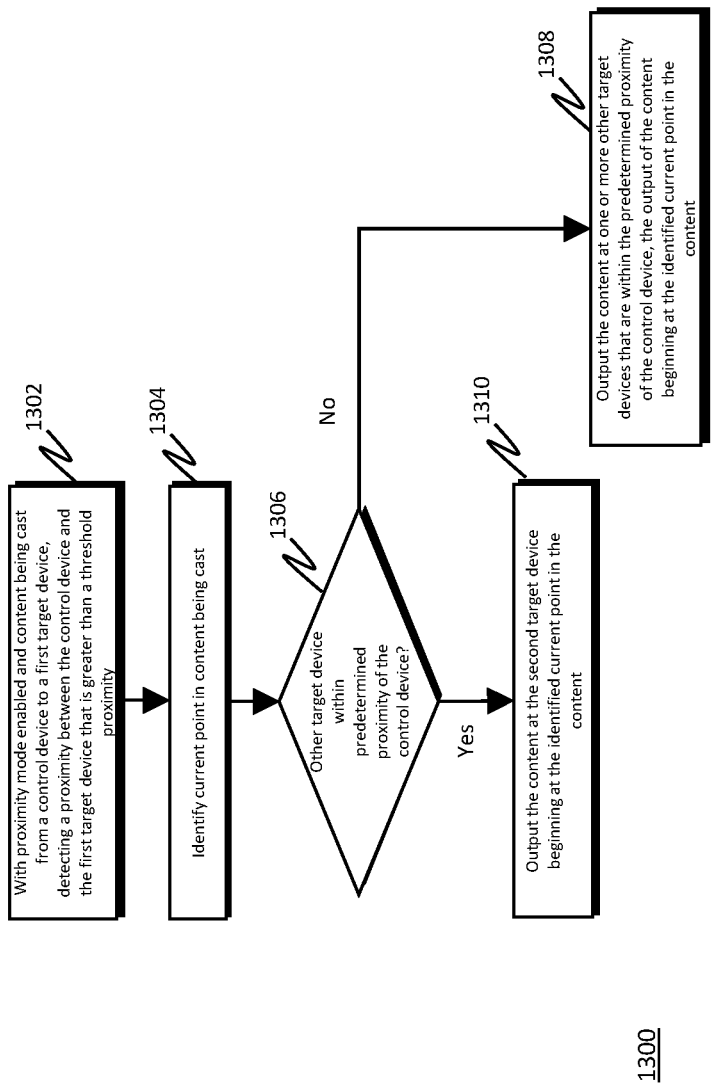
FIG. 13 is a flowchart illustrating a process operable to facilitate switching output devices from a first target device based upon an increased distance between the first target device and a control device in accordance with an exemplary embodiment.

FIG. 13 is a flowchart illustrating a process 1300 operable to facilitate switching output devices from a first target device based upon an increased distance between the first target device and a control device in accordance with an exemplary embodiment. With a proximity mode enabled and content being cast from a control device to a first target device, the control device may detect a proximity between the control device and the first target device that is greater than a threshold proximity (step 1302). For example, a first channel may be utilized by the control device to determine a proximity between the control device and one or more client devices 105. The proximity information retrieved by the control device over the first channel may indicate that the control device has been moved away from the first target device.

The control device may identify a current point in the content that is being cast to the first target device (step 1304).

Using proximity information retrieved by the control device, the control device may determine whether another target device is within a certain proximity of the control device (step 1306). If another target device is not within a certain proximity of the control device, the control device may initiate an output of the content at the control device beginning at the identified current point in the content (step 1308). If another target device is within a certain proximity of the control device (step 1306), the control device may initiate an output of the content at the other target device beginning at the identified current point in the content (step 1310).

Figure 14:
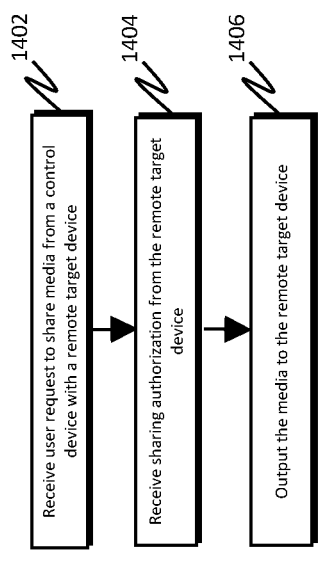
FIG. 14 is a flowchart illustrating a process operable to facilitate outputting media to a remote target device in response to a sharing authorization in accordance with an exemplary embodiment.

FIG. 14 is a flowchart illustrating a process 1400 operable to facilitate outputting media to a remote target device in response to a sharing authorization in accordance with an exemplary embodiment.

The Swipe feature includes the selection of one or more SMDs that are in remote locations, for which the feature is enabled on those SMDs and for which the mobile client is authorized to share content. For example, a user (user #1) elects to Swipe (share) a photo with a friend (user #2) who is remotely located (step 1402). User #2 uses their mobile application or SMD application to authorize User #1's device (step 1404). User #1 will then be presented with the option to Swipe content to User #2's SMD. In response, the content may be output at the remote target device (step 1406).

Figure 15:
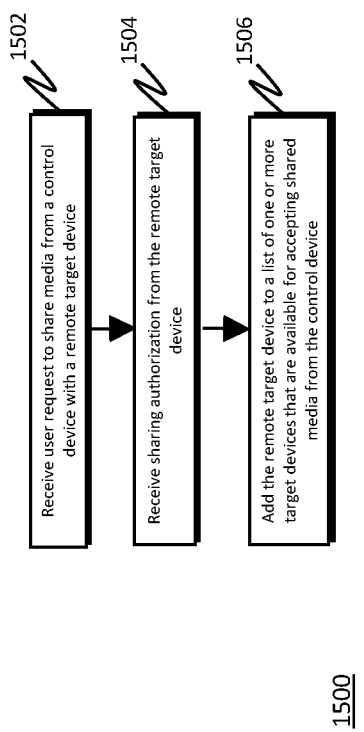
FIG. 15 is a flowchart illustrating a process operable to facilitate adding a remote target device to a list of target devices in response to a sharing authorization in accordance with an exemplary embodiment.

FIG. 15 is a flowchart illustrating a process 1500 operable to facilitate adding a remote target device to a list of target devices in response to a sharing authorization in accordance with an exemplary embodiment. The control device may receive a user request to share media with a remote target device (step 1502). In response to receiving a sharing authorization from a remote target device (step 1504), a control device may add the remote target device to a list of one or more target devices that are available for accepting shared media from the control device (step 1506).

Figure 16:
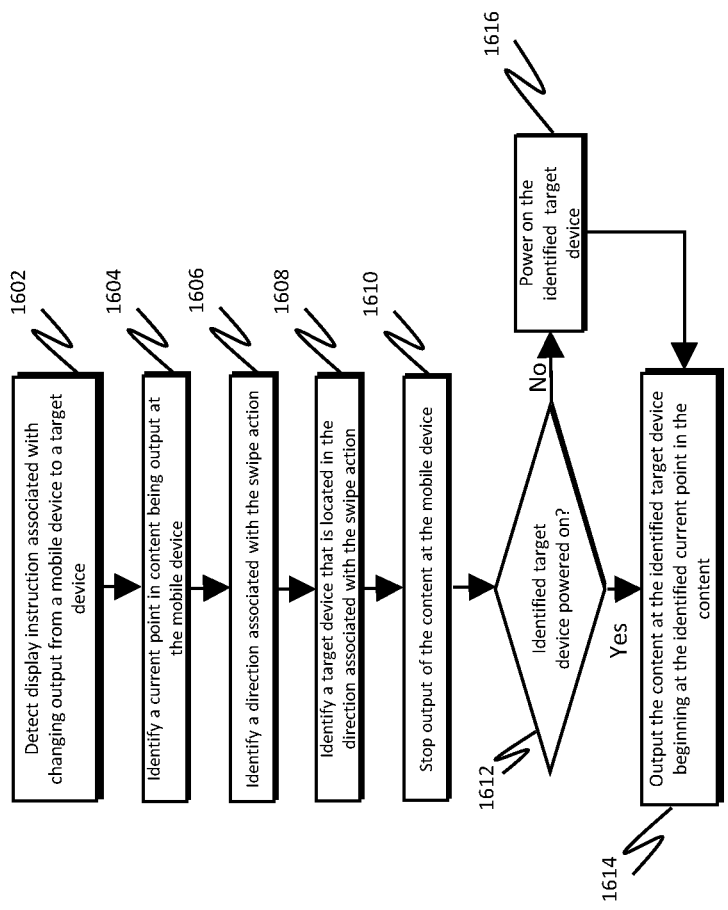
FIG. 16 is a flowchart illustrating a process operable to identifying a target device based upon a direction of a detected swipe action in accordance with an exemplary embodiment.

FIG. 16 is a flowchart illustrating a process 1600 operable to identifying a target device based upon a direction of a detected swipe action in accordance with an exemplary embodiment.

The control device may detect a display instruction associated with changing the output from the control device to a target device (step 1602). User has the option to manually select a target device based on the directional location detected by the control device. For example, if the target device is detected to be in front of the user, swiping content forward when in this mode, would initiate the display of that content on the target device directionally located in front of the control device. The control device may identify a current point in the content being output (step 1604) and identify a direction associated with the swipe action (step 1606). The control device may identify a target device that is located in the direction associated with the swipe action (step 1608) and stop output of the content (step 1610). If the identified target device is powered on (step 1612), the output of the content is started at the identified target device beginning at the current point in the content identified by the control device (step 1614). If the identified target is not powered on, the target device is powered on (step 1616) then starts outputting the content is started at the identified target device beginning at the current point in the content identified by the control device (step 1614).

Figure 17:
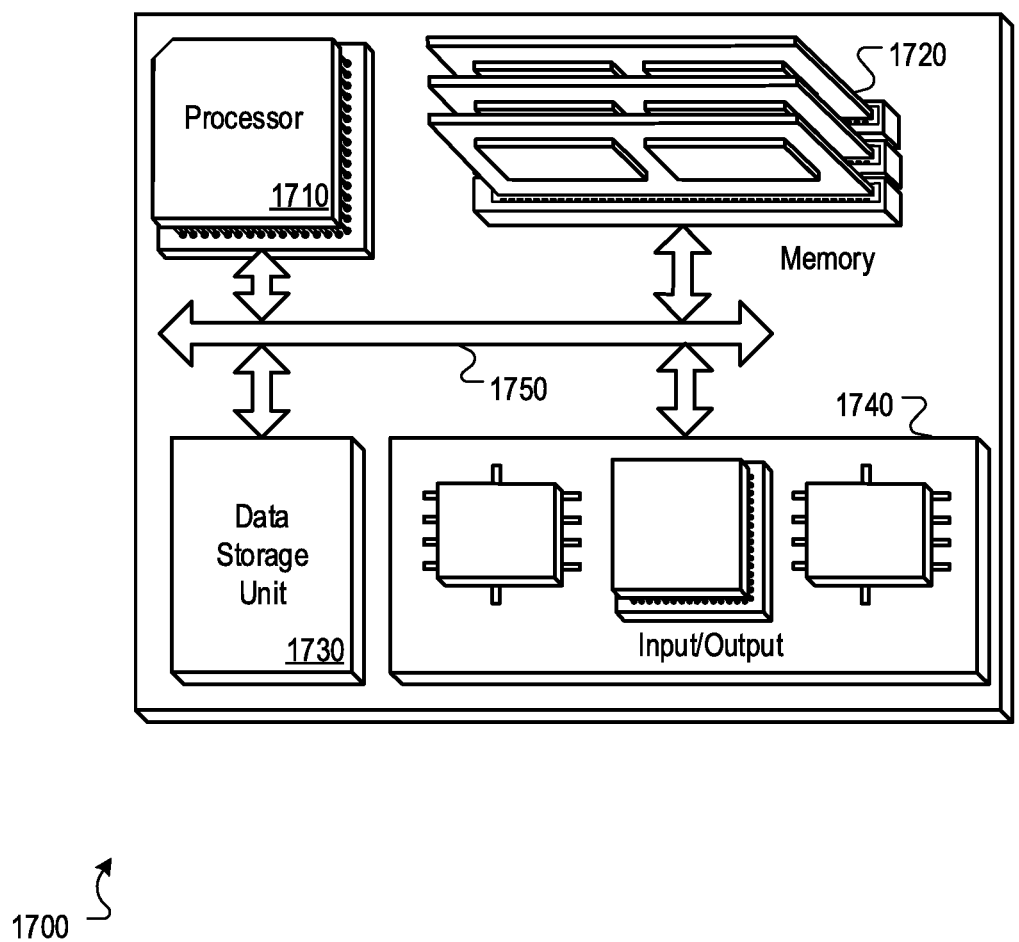
FIG. 17 is a block diagram of a hardware configuration operable to facilitate the control of displayed content at multiple devices in accordance with an exemplary embodiment.

FIG. 17 is a block diagram of a hardware configuration 1700 operable to facilitate the control of displayed content at multiple devices in accordance with an exemplary embodiment. The hardware configuration 1700 can include a processor 1710, a memory 1720, a storage device 1730, and an input/output device 1740. Each of the components 1710, 1720, 1730, and 1740 can, for example, be interconnected using a system bus 1750. The processor 1710 can be capable of processing instructions for execution within the hardware configuration 1700. In one implementation, the processor 1710 can be a single-threaded processor. In another implementation, the processor 1710 can be a multi-threaded processor. The processor 1710 can be capable of processing instructions stored in the memory 1720 or on the storage device 1730.

The memory 1720 can store information within the hardware configuration 1700. In one implementation, the memory 1720 can be a computer readable medium. In one implementation, the memory 1720 can be a volatile memory unit. In another implementation, the memory 1720 can be a non-volatile memory unit.

In some implementations, the storage device 1730 can be capable of providing mass storage for the hardware configuration 1700. In one implementation, the storage device 1730 can be a computer-readable medium. In various different implementations, the storage device 1730 can, for example, include a hard disk device, an optical disk device, flash memory or some other large capacity storage device. In other implementations, the storage device 1730 can be a device external to the hardware configuration 1700.

The input/output device 1740 provides input/output operations for the hardware configuration 1700. In embodiments, the input/output device 1740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, computer, tablet, mobile device, etc.). In embodiments, the input/output device can include driver devices configured to send communications to, and receive communications from one or more networks (e.g., subscriber network 120 of FIG. 1, WAN 115 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for outputting content from a computing device, comprising:
   storing, in a memory device of the computing device, a plurality of user swipe patterns, each user swipe pattern having corresponding display instructions and device control actions;
   receiving, via an input device of the computing device, haptic-based swipe pattern as a user input;
   comparing, in a processor of the computing device, the user input to the plurality of stored user swipe patterns to determine whether the user input is one of a plurality of casting actions that control an output of content from the client device to a plurality of target devices;
   identifying, in the processor of the computing device, at least one target device of the plurality of target devices that is eligible to output the content based on a the determined casting action;
   identifying, in the processor of the computing device, content source information associated with the content to be output by the at least one identified target device;
   generating, in the processor of the computing device, one or more content output instructions for use by the at least one identified target device to control output of the content, the one or more content output instructions being generated based on the determined casting action and including at least playback instructions that control output of the content source information on the at least one identified target device; and
   sending, via an output device of the computing device, the one or more content output instructions to the at least one identified target device over a wireless connection.

2. The method of claim 1, wherein receiving the user input comprises:
   detecting a display instruction associated with outputting content from the computing device to one or more of the plurality of target devices.

3. The method of claim 1, wherein determining whether the user input is a casting action, comprises:
   determining whether the user input is mapped to a casting action.

4. The method of claim 3, comprising:
   identifying the casting action associated with the user input.

5. The method of claim 1, wherein the step of identifying at least one target device that is eligible for outputting content comprises:
   determining a proximity between the computing device and at least one of the plurality of target devices.

6. The method of claim 1, wherein the step of identifying content source information associated with content to be displayed by the at least one identified target device, comprises:
   identifying current content being output by the computing device or by another of the plurality of target devices.

7. The method of claim 1, wherein the casting action for outputting content is an action for changing content being displayed at the least one of the identified target devices.

8. The method of claim 1, wherein the one or more content output instructions include device instructions that control at least one operation of the at least one target device.

9. The method of claim 1, wherein comparing the user input to the plurality of stored user swipe patterns determines whether the user input includes multiple swiping motions for the one of the plurality of casting actions.

10. A computing device, comprising:
    a memory device configured to store a plurality of user swipe patterns, each user swipe pattern having corresponding display instructions and device control actions;
    an input device configured to receive a user input as a haptic-based swipe pattern;
    a processor configured to:
       compare the user input to the plurality of stored user swipe patterns to determine whether the user input is one of a plurality of casting actions that control an output of content to at least one target device of a plurality of target devices;
       identify the at least one target device of the plurality of target devices that is eligible to output the content based on the determined casting action;
       identify content source information associated with content to be output by the at least one identified target device; and
       generate one or more content output instructions for use by the at least one identified target device to control output of the content, the one or more content output being generated based on the determined casting action and including at least playback instructions that control output of the content source information on the at least one identified target device; and
    an output device configured to send the one or more content output instructions to the at least one identified target device over a wireless connection.

11. The computing device of claim 10, wherein:
    the input device comprises a display device, and
    the processor is configured to detect a display instruction associated with outputting content from the computing device to the plurality of target devices.

12. The computing device of claim 10, wherein the user input is a first user input and the casting action is a first casting action, the device comprising:
   memory for storing a mapping of one or more user inputs to specified casting actions,
   wherein the processor is configured to determine whether the first user input is mapped to the first casting action.

13. The computing device of claim 10, wherein:
   the processor is configured to identify the at least one target device that is eligible to output the content based on the casting action or a proximity between the computing device and at least the plurality of target devices.

14. The computing device of claim 10, wherein the casting action is an action for changing content being displayed at the at least one identified target devices.

15. The computing device of claim 14, wherein the processor is configured to identify the casting action associated with the user input.

16. The computing device of claim 10, wherein the one or more content output instructions include device instructions that control at least one operation of the at least one target device.

17. The computing device of claim 10, wherein the processor is further configured to compare the user input to the plurality of stored user swipe patterns determines whether the user input includes multiple swiping motions for the one of the plurality of casting actions.

18. A non-transitory computer readable memory storing program code for outputting content from a computing device, which when the memory is placed in communicable contact with a computing device, the program code causes the computing device to perform the steps of:
   storing, in a memory device of the computing device, a plurality of user swipe patterns, each user swipe pattern having corresponding display instructions and device control actions;
   receiving, via an input device of the computing device, a haptic-based swipe pattern as a user input;
   comparing, in a processor of the computing device, the user input to the plurality of stored user swipe patterns to determine whether the user input is one of a plurality of casting actions that control an output of content from the client device to a plurality of target devices;
   identifying, in the processor of the computing device, at least one target device of the plurality of target devices that is eligible to output the content based on the determined casting action;
   identifying, in the processor of the computing device, content source information associated with the content to be output by the at least one identified target device;
   generating, in the processor of the computing device, one or more content output instructions for use by the at least one identified target device to control output of the content, the one or more content output instructions being generated based on the determined casting action and including at least playback instructions that control output of the content source information on the at least one identified target device; and
   sending, via an output device the computing device, the one or more content output instructions to the at least one identified target device over a wireless connection.

19. The computer readable medium of claim 18, wherein, the one or more content output instructions include device instructions that control at least one operation of the at least one target device.

20. The computer readable medium of claim 18, wherein comparing the user input to the plurality of stored user swipe patterns determines whether the user input includes multiple swiping motions for the one of the plurality of casting actions.

* * * * *